US010369472B1

(12) United States Patent
Mattar et al.

(10) Patent No.: US 10,369,472 B1
(45) Date of Patent: Aug. 6, 2019

(54) VIRTUAL ENVIRONMENT MAPPING SYSTEM

(71) Applicant: Electronic Arts Inc., Redwood City, CA (US)

(72) Inventors: Mohamed Marwan Mattar, San Francisco, CA (US); Meng Wu, Fremont, CA (US); John Kolen, Half Moon Bay, CA (US); Navid Aghdaie, San Jose, CA (US); Kazi Atif-Uz Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 51 days.

(21) Appl. No.: 15/474,975

(22) Filed: Mar. 30, 2017

(51) Int. Cl.
*G06F 17/00* (2019.01)
*A63F 13/5378* (2014.01)
*A63F 13/35* (2014.01)
*A63F 13/79* (2014.01)
*G06N 20/00* (2019.01)
*G06F 16/29* (2019.01)
*G06F 16/955* (2019.01)
*G06F 16/9535* (2019.01)

(52) U.S. Cl.
CPC .......... *A63F 13/5378* (2014.09); *A63F 13/35* (2014.09); *A63F 13/79* (2014.09); *G06F 16/29* (2019.01); *G06F 16/955* (2019.01); *G06F 16/9535* (2019.01); *G06N 20/00* (2019.01)

(58) Field of Classification Search
CPC .......................... A63F 13/216; A63F 2300/69
See application file for complete search history.

(56) References Cited

U.S. PATENT DOCUMENTS

| 9,669,296 | B1* | 6/2017 | Hibbert | A63F 13/12 |
| 9,782,668 | B1* | 10/2017 | Golden | A63F 13/00 |
| 2002/0090985 | A1* | 7/2002 | Tochner | A63F 13/12 463/1 |
| 2006/0223635 | A1* | 10/2006 | Rosenberg | A63F 13/10 463/37 |
| 2007/0021166 | A1* | 1/2007 | Mattila | A63F 13/12 463/1 |
| 2008/0146338 | A1* | 6/2008 | Bernard | A63F 13/00 463/42 |
| 2009/0005140 | A1* | 1/2009 | Rose | A63F 13/00 463/7 |

(Continued)

OTHER PUBLICATIONS

Hecht et al. "Automatic identification of building types based on topographic databases—a comparison of different data sources" International Journal of Cartography. vol. 1, 2015—Issue 1. pp. 18-31. Published online Aug. 7, 2015.*

*Primary Examiner* — Dmitry Suhol
*Assistant Examiner* — Carl V Larsen
(74) *Attorney, Agent, or Firm* — Knobbe, Martens, Olson & Bear, LLP

(57) ABSTRACT

The present disclosure provides embodiments of a virtual mapping system for using real world geographical locations to generate virtual environments within game applications. The virtual mapping system allows a game application to identify geographical information associated with real world locations. The geographical information can be used by the game application to recreate the selected geographical location using virtual assets from the game application.

14 Claims, 8 Drawing Sheets

(56) References Cited

U.S. PATENT DOCUMENTS

| | | | |
|---|---|---|---|
| 2010/0306825 A1* | 12/2010 | Spivack | H04W 4/029 726/4 |
| 2012/0264518 A1* | 10/2012 | Rouille | A63F 13/79 463/39 |
| 2014/0278847 A1* | 9/2014 | Gallo | G06Q 30/0252 705/14.5 |

* cited by examiner

VIRTUAL ENVIRONMENT MAPPING SYSTEM

BACKGROUND

Some video games can allow players to manage and update various simulations in which a user may build, expand, or manage towns, cities, farms, communities, theme parks and/or other types of simulations. The games can allow players to acquire and organize gameplay assets within the gameplay areas. Sometimes players will attempt to organize their areas into various shapes, designs, cities, or other configurations.

SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method comprising: under control of one or more hardware computing devices configured with specific computer-executable instructions, the specific computer-executable instructions stored in an electronic hardware memory, receiving, over a network from a user computing system executing a video game application, a location identifier data packet comprising an indication of a geographic location; receiving, over the network, geographic information data packets from at least one mapping service, the geographic information data packets comprising geographic data associated with the geographic location; determining a geographic region based at least in part on the location identifier data packet and the geographic information data packets; identifying a plurality of geographic entities within the geographic region based at least in part on an analysis of at least a portion of the geographic information data packets; for at least a subset of the plurality of geographic entities within the geographic region, determining attributes defining the geographic entity, resulting in a plurality of defined geographic entities; accessing virtual asset data in a physical data store, wherein the physical data store is configured to store virtual asset data structures storing virtual asset data defining a plurality of virtual assets used within the game application; for each defined geographic entity of the plurality of defined geographic entities, matching the defined geographic entity to a virtual asset based at least in part on the determined attributes of the defined geographic entity, resulting in a plurality of matched virtual assets; generating a virtual environment map comprising matched virtual assets of the plurality of matched virtual assets positioned at defined locations within the virtual environment map, wherein the locations of the matched virtual assets within the virtual environment map correspond to locations of the geographic entities within the geographic region; and transmitting a map output data packet to the user computing system, the map output data packet comprising instructions for display of the virtual environment map within the game application.

Another embodiment discloses a system comprising: an electronic data store configured to store virtual asset data storing virtual asset data defining a plurality of virtual assets used within the game application; a hardware processor in communication with the electronic data store, the hardware processor configured to execute specific computer-executable instructions to at least: receive, over a network from a user computing system executing a video game application, a location identifier data packet comprising an indication of a geographic location; determine a geographic region based at least in part on the location identifier data packet and geographic information associated with the geographic location, wherein the geographic region comprises a plurality of geographic entities; for at least a subset of the plurality of geographic entities within the geographic region, determine attributes defining the geographic entity, resulting in a plurality of defined geographic entities; access virtual asset data in the electronic data store; for each defined geographic entity of the plurality of defined geographic entities, match the defined geographic entity to a virtual asset based at least in part on the determined attributes of the defined geographic entity, resulting in a plurality of matched virtual assets; generate a virtual environment map comprising matched virtual assets of the plurality of matched virtual assets positioned at defined locations within the virtual environment map, wherein the locations of the matched virtual assets within the virtual environment map correspond to locations of the geographic entities within the geographic region; and transmit a map output data packet to the user computing system, the map output data packet comprising instructions for display of the virtual environment map within the game application.

Another embodiment discloses a non-transitory computer-readable storage medium storing computer executable instructions that, when executed by one or more computing devices, configure the one or more computing devices to perform operations comprising: under control of one or more hardware computing devices configured with specific computer-executable instructions, the specific computer-executable instructions stored in an electronic hardware memory, receiving, over a network from a user computing system executing a video game application, a location identifier data packet comprising an indication of a geographic location; determining a geographic region based at least in part on the location identifier data packet and geographic information associated with the geographic location, wherein the geographic region comprises a plurality of geographic entities; for at least a subset of the plurality of geographic entities within the geographic region, determining attributes defining the geographic entity, resulting in a plurality of defined geographic entities; accessing virtual asset data in a physical data store, wherein the physical data store is configured to store virtual asset data structures storing virtual asset data defining a plurality of virtual assets used within the game application; for each defined geographic entity of the plurality of defined geographic entities, matching the defined geographic entity to a virtual asset based at least in part on the determined attributes of the defined geographic entity, resulting in a plurality of matched virtual assets; generating a virtual environment map comprising matched virtual assets of the plurality of matched virtual assets positioned at defined locations within the virtual environment map, wherein the locations of the matched virtual assets within the virtual environment map correspond to locations of the geographic entities within the geographic region; and transmitting a map output data packet to the user computing system, the map output data packet comprising instructions for display of the virtual environment map within the game application.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
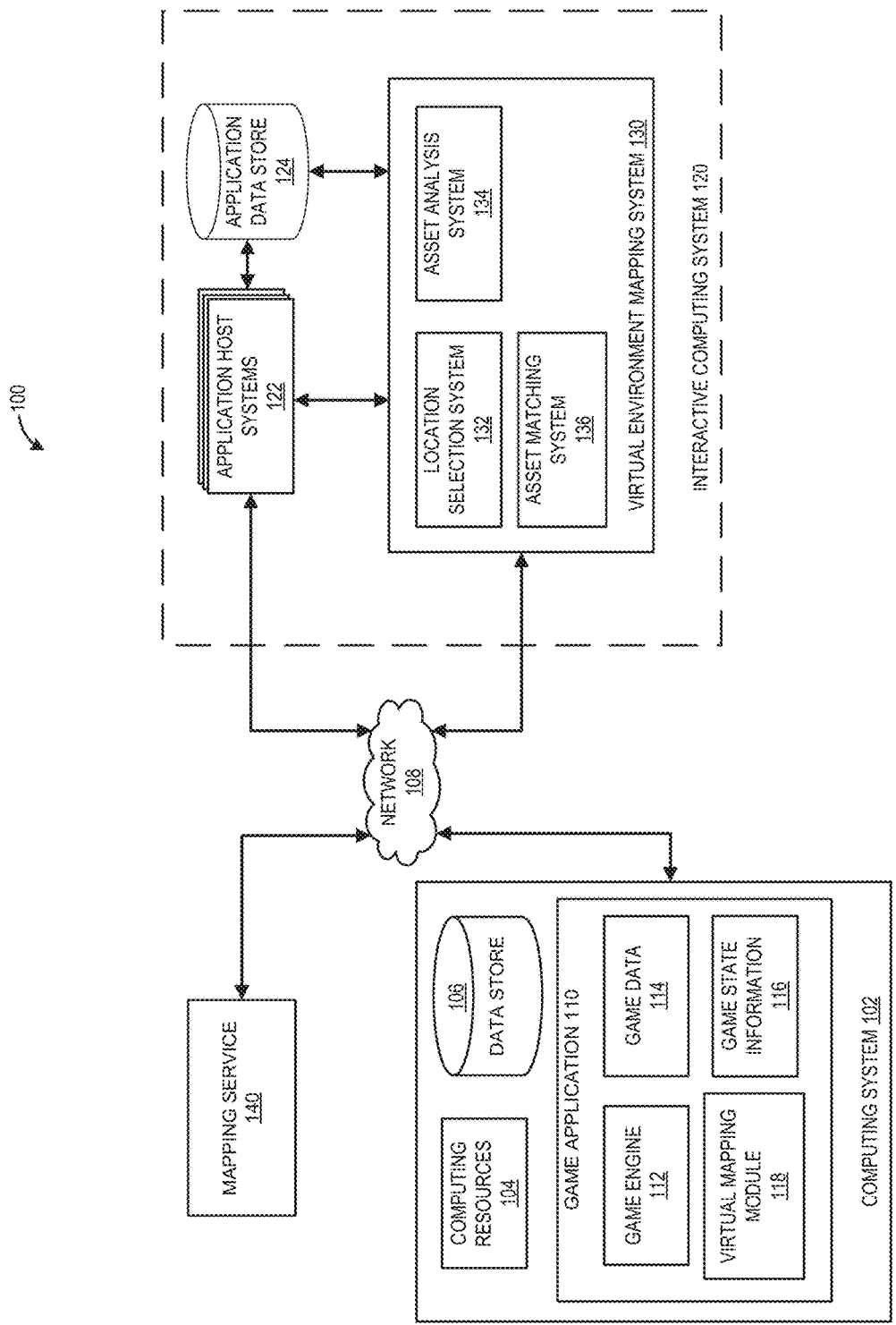
FIG. 1 illustrates an embodiment of a networked computing environment that can implement one or more embodiments of a virtual environment mapping system.

The present disclosure provides embodiments of a virtual mapping system for using real world geographical locations to generate virtual environments within game applications. The virtual mapping system allows a game application to identify geographical information associated with real world locations. The geographical information can be used by the game application to recreate the selected geographical location using virtual assets from the game application.

In an illustrative embodiment, a game application may receive a request to recreate Los Angeles within the game application. A virtual mapping system, within or in communication with the game application, may identify a portion or the entirety of Los Angeles that is being recreated based on the constraints and/or rule sets of the game application. The virtual environment mapping system can access geographical information associated with the identified location and analyze the geographical information to identify geographic entities within the identified location. The virtual environment mapping system can determine attributes associated with each of the geographic entities. The virtual environment mapping system can match the geographic entities to virtual assets within the game application. Based on the matching, the virtual environment mapping system can generate a virtual environment map of the identified location using the virtual assets within the game application. The generated virtual environment map can be output to the game application.

In some embodiments, the virtual environment mapping system can be configured to match virtual assets associated with a user account within the game application to the generated virtual environment map. The virtual environment mapping system can identify virtual assets that are missing from the virtual assets associated with the user account. The virtual environment mapping system may automatically populate the generated virtual environment map with the virtual assets from the user's account. The virtual environment mapping system can populate the map using various algorithms that could be selected based on how the game application would like to incentivize the user to build up various locations within map or acquire additional virtual assets in order to complete mission portions within the map. The virtual environment mapping system can generate a listing of the missing virtual assets required by the user to complete the map. In some embodiments, the virtual environment mapping system can provide recommendations to the user for acquisition of missing virtual assets. The recommendations can provide the user with in-game actions that are required (such as, missions, quests, and the like), the amount of virtual or real currency required (such as tokens, gold, gems, and the like), optional replacement virtual assets already owned by the user, and/or other types of recommendations for completing the virtual mapping. In some embodiments, the virtual environment mapping system can reorder the display of assets within the application based on the location selected by the user. The virtual assets needed to complete the map of the selected location can be prioritized above other virtual assets and displayed prior to the other virtual assets in virtual asset acquisition portion of the application.

Overview of Virtual Environment Mapping System

FIG. 1 illustrates an embodiment of a computing environment 100 for implementing a virtual environment mapping system 130. The computing environment 100 includes a network 108, a user computing system 102, a mapping service 140, and an interactive computing system 120. The interactive computing system 120 includes application host systems 122, an asset data store 124, and a virtual environment mapping system 130. To simplify discussion and not to limit the present disclosure, FIG. 1 illustrates only one user computing system 102, one mapping service 140, and one interactive computing system 120, though multiple systems may be used. The user computing system 102 may communicate via a network 108 with the interactive computing system 120. Although only one network 108 is illustrated, multiple distinct and/or distributed networks 108 may exist.

User Computing Systems

The user computing system 102 may include hardware and software components for establishing communications over a communication network 108. For example, the user systems 102 may be equipped with networking equipment and network software applications (for example, a web browser) that facilitate communications via one or more networks (for example, the Internet or an intranet). The user computing system 102 may have varied local computing resources 104 such as central processing units and architectures, memory, mass storage, graphics processing units, communication network availability and bandwidth, and so forth. The user computing system 102 may include one or more data stores 106 for storing information associated with the execution of the computing system 102 and the game application 110. Further, the user computing system 102 may include any type of computing system. For example, the user computing system 102 may include any type of computing device(s), such as desktops, laptops, video game platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below with respect to FIG. 5.

Game Application

The user computing system 102 can execute a game application 110 based on software code stored at least in part in the data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, route information, and other data structures. In the illustrated embodiment, the game application 110 includes a game engine 112, game data 114, game state information 116, and a virtual mapping module 118.

In some embodiments, the user computing system 102 is capable of executing a game application 110, which may be stored and/or executed in a distributed environment. For example, the user computing system 102 may execute a portion of the game application 110, and a network-based computing system may execute another portion of the game application 110. For instance, the game application 110 may be a network-based simulation game where users build and manage virtual environments, in which a client portion can be executed by the user computing system 102 and a server portion can be executed by one or more application host systems 122.

Game Engine

The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, rendering information, environmental settings, constraints, skeleton models, virtual asset information, meshes, skins, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, jumps, runs, throws, attacks and other events appropriate for the game application 110. During runtime operation, the game engine 112 can read in game data 114 and game state information 116 to determine the appropriate in-game events.

Game Data

The game data 114 can include game rules, virtual assets, environmental settings, environmental objects, constraints, skeleton models, meshes, skins, and/or other game application information. At least a portion of the game data 114 can be stored in the data store 106. In some embodiments, a portion of the game data 114 may be received and/or stored remotely, such as in the application data store 124, in such embodiments, game data may be received during runtime of the game application.

Game State Information

During runtime, the game application 110 can store game state information 116, which can include a game state, character states, environment states, scene object storage, mapping information, location information, and/or other information associated with a runtime state of the game application 110. For example, the game state information 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game.

Virtual Mapping Module

The virtual mapping module 118 can perform various functions to provide virtual mapping functionality within the game application 110 and can operate during runtime of the game application 110. The virtual mapping module 118 can use information received from the interactive computing system 120 to perform various mapping functions. In some embodiments, the virtual mapping module 118 can receive mapping information from the interactive computing system 130 prior to execution of the game application, such as in an update to the game application. In some embodiments, the game application 110 may receive mapping information from the interactive computing system 130 during runtime. In such embodiments, the virtual mapping module 118 can dynamically update mapping information within the game application 110 based on the information received from the interactive computing system 120 during runtime.

Functions of the virtual mapping module 118 can include one or more functions associated with the virtual environment mapping system 130. For example, the virtual mapping module 118 may implement, in part or in whole, various aspects of the location selection system 132, the asset analysis system 134, and/or the asset matching system 136. The virtual mapping module 118 may be configured to communicate with the mapping service 140 in order to execute various virtual mapping functionalities. Some functions may include generating and providing a mapping user interface, selecting a real-world location, analyzing geographic entities, matching virtual assets to geographic entities, generating a virtual environment map, providing recommendations to a user within the game application, and/or other virtual mapping functions within the game application. Various aspects of the operation of the virtual mapping module 118 are described in further detail herein.

Mapping Service

The mapping service 140 can represent one or more mapping services that can be configured to provide geographical and supplemental data associated with geographic locations (such as, for example, Google® Maps, Yelp®, and others). The geographical data can include spatial and topographical information (such as, for example, longitudes, latitudes, elevation, and the like), entity information, and other data associated with geographical locations. In the context of the present disclosure, a "geographical entity" can refer to any topographical and real-world entity within a geographical area, such as, for example, vegetation (trees, bushes, hedges, and the like), structures (houses, building, airports, monuments, and the like), infrastructure (roads, sidewalks, subways, railways, and the like), terrain (grass, sand, water, hills, rivers, mountains, and the like), and/or other entities within a geographical area. The mapping service systems 140 can include supplemental information associated with entities within the region. For example, the supplemental information can include business information, such as the name and type of a business.

Interactive Computing System

The interactive computing system 120 can include one or more application host systems 122, and asset data store 124, and a virtual environment mapping system 130. The interactive computing system 120 may include one or more computing systems configured to execute a portion of the game application 110. In some embodiments, the one or more application host systems 122 can include one or more computing devices, such as servers and databases that may host and/or execute a portion of one or more instances of the game application 110. In certain embodiments, instead of or in addition to executing a portion of the game application 110, the application host systems 122 may execute other applications, which may complement and/or interact with the game application 110.

Application Host System

The interactive computing system 120 may enable multiple users or computing systems to access a portion of the game application 110 executed or hosted by the interactive computing system 120. In some embodiments, the host application system 122 may execute a hosting system for executing various aspects of a game environment. For example, in one embodiment, the game application 110 may be a competitive game, such as a first person shooter or sports game, and the host application system 122 can provide a dedicated hosting service for hosting multiplayer game instances or facilitate the creation of game instances hosted by user computing devices. In some embodiments, the host application system 122 can provide a lobby or other environment for users to virtually interact with one another. Such environments may provide functionality for visiting game environments of other players, such as to view virtual maps associated with a game application of the user.

Application Data Store

The interactive computing system 120 can include one or more application data stores 124 that are configured to store information associated with the game application 110 hosted by the interactive computing system 120 and/or the application host systems 122. The application data store 124 can be a physical data store that is configured to store data structures containing information associated with the game application 110. The application data store 124 can be configured to store virtual asset information, user account information, geographical data, including topographical and geographic entity information, virtual mapping information, and/or other information associated with game application 110.

Virtual Environment Mapping System

The virtual environment mapping system 130 130 can provide a system that uses real-world geographical information for utilization within a virtual environment of a game application 110. The virtual environment mapping system 130 may include a location selection system 132, an asset analysis system 134, and an asset matching system 136.

The real-world geographical information can be acquired from one or more sources, such as the mapping service 140, the interactive computing system 120, and/or other sources. The virtual environment mapping system 130 can identify geographical information associated with real world locations. The geographical information can include spatial and topographical information, geographical entity information, and other data associated with geographical locations, which can be used for the creation and mapping of virtual environments within the game application 110.

Location Selection System

The location selection system 132 can be configured to identify a specific region within the real world. The location selection system 132 can use various mechanisms for filtering, prioritizing, and selecting a region based on a location identifier received from a user computing system. The location selection system 132 can communicate with a mapping service 140 to retrieve real world geographical information associated with one or more geographical locations.

The location selection system 132 can be configured to receive a location identifier from a user, such as, for example a specific address, a zip code, a city, or other location identifier within the game application. The location selection system 132 can identify one or more regions based on the location identifier. The location selection system 132 can query a map database and identify a specific address. Some location inputs may identify large geographic areas, such as a city (for example, London), a location of interest (for example, a Yellowstone National Park), a zip code, a region, or other type of location identifier. The location selection system 132 can use the location identifier to identify a region based at least in part on rules and/or constraints of the game application. As needed, the location selection system 132 can be configured to refine the location identifier so that an appropriate region can be selected. For example, a game application may restrict the region associated with a location identifier to a specific size, such as, for example, a two mile square, a one mile radius from a specific address, a city, or other type of size constraint associated with the game application 110.

In some embodiments, the game application may provide the user with additional control over various parameters associated with the location selection, such as the size of the region. The location selection system 132 can expand or decrease a region based on input from a user. For example, a user can select streets within a specific neighborhood, or a portion of a city, or another user defined region. In some embodiments, the game application 110 may be configured to provide a region editor that allows for the user to select and define the specific region on a map. The game application may be configured to allow a user to edit constraints that automatically determine the size of the region, such as, for example expanding or decreasing a radius from a specific address, or any other parameter that can shape the region within the virtual environment. The modifications to the size and shape and the region can be based on the rules and constraints of the game application 110.

In some embodiments, the location selection system 132 can be configured to allow a user to select a time frame associated with the location identifier. In such an instance, the location identifier can be associated with the present day location or the location at some historical period of time, such as, 20 years ago, 50 years ago, or any other time frame for which the location selection system 132 can access historical geographical data associated with the location. For example, a user may wish to select New York City in 1950.

In some embodiments the system can identify popular locations based on historical selections or other user maps. The identified popular location can be based on previous user selections over a defined period of time, such as, for example, the past day, past month, past year, all time, and so forth. For example, if a user selected Los Angeles, the location selection system 132 could identify popular locations within Los Angeles and then prioritize the locations based on one or more prioritization criteria. In some embodiments, the location selection system 132 may be configured to recommend a location. The location selection system 132 may determine the recommendation based on various factors, such as, for example, popularity of the location, the number of virtual assets associated with a user account that match virtual asset requirements of the location, proximity to other locations searched by the user, and/or other factors. In some embodiments, the user may be able to request recommendations based on various sorting criteria. For example, the location selection system 132 can determine the locations that best match the virtual assets owned by the user. The location selection system 132 may determine a matching score associated with the recommended locations.

In some instances, the matching score can include weighted values that vary based on the sorting criteria selected by the user.

Asset Analysis System

The asset analysis system 134 can be configured to analyze geographic data to identify geographic entities and determine attributes associated with the geographic entities. The asset analysis system 134 can analyze geographic data using image recognition analysis, supplemental data analysis, and/or other types of analyses. Geographical information associated with the geographic entities can be received from the mapping service 140, the location selection system 132, the asset matching system 136, the application data store 124, the data store 106, and/or other data repositories or systems.

Geographic data associated with a location identifier can be gathered based on the defined region. The geographic data may include various types of information, such as topographical information, geographic entity information, supplemental information, and/or other types of geographic information. The topographical information may include elevations, longitudes, latitudes, and/or other topographical information. The geographic entity information may include information that defines geographic entities within the defined region. A geographical entity can refer to any type of fixtures within a geographical area, such as, for example, vegetation (trees, bushes, hedges, and the like), structures (houses, building, airports, monuments, and the like), infrastructure (roads, sidewalks, subways, train tracks, and the like), and/or other entities within a geographical area. The supplement information may provide additional information, such as classifications of entities, or other information.

The asset analysis system 134 can analyze the available geographic information associated with a region to gather identify geographic entities and define a virtual environment map. The geographic entities can be identified, partitioned, and associated with a specific locational reference. The locational reference may include an address (such as a building address); geospatial coordinates or areas, which may use an absolute reference point (such as, a longitude and latitude) or a relative reference point (such as a grid location within a grid generated for the defined region); and/or other information defining the location of the entity. Topographical information associated with the region may be used to define an underlying topography of a virtual environment map. In some embodiments, the virtual environment map may use a defined coordinate system, which may be used in determining location references for each of the geographic entities within a region.

An image recognition analysis can be used to identify visual characteristics associated with the topographical information and the geographical entity information of a region. Image data for a region may include street view maps, satellite maps, and/or other image data repositories associated with the real world location. Some geographic entities are explicitly identified within map data such as properties (houses, buildings, and the like) and infrastructure (such as roads, trails, and the like), and/or other permanent fixtures. The image recognition analysis can help to identify geographic entities within a region that may not be explicitly identified within map data, such as trees, bushes, fire hydrants, street signs, and/or other entities that may be present within a region.

The image recognition analysis can be used to analyze visual characteristics associated with the topography and the entities. For example, the image recognition analysis may be used to identify attributes of a building, such as specific colors, shape, size, number of floors, and/or other characteristics; a type of tree; the color of the landscape; and/or other information visually associated with the topography or entities. The image recognition analysis can recognize the names of locations (such as parks, schools, and other locations) and businesses in order to associate the locations with a type of entity, such as a coffee shop, a hardware store, and the like. In some embodiments, the image recognition system can populate a matrix of attributes for each entity within a region.

The asset analysis system 134 can include a supplemental data analysis to identify information associated with entities. For example, the mapping services 140 (such as, for example, Google® Maps, Yelp®, and others) can be queried to provide supplemental information associated with entities within the region. The services may be queried based on the address associated with the entity or based on other identification information. For example, the data may classify a building address as a restaurant, a gym, an office building, or other type of location.

Asset Matching System

The asset matching system 136 can match topography and geographic entities within a region to virtual assets within the game application 110. The asset matching system 136 can use the attributes determined by the asset analysis system 134 and attributes of the virtual assets to determine matches between the virtual assets and the geographic entities. Virtual assets can include any assets within the game application, such as virtual buildings, vegetation, infrastructure, and/or any other virtual construct for use with a game application. The virtual assets may have defined attributes. Depending on the type of game application, the virtual assets can have various properties associated with the asset. An asset can be three-dimensional or two-dimensional. The asset can have a mesh and a skin. The mesh can define the size and shape of the virtual asset and the skin can define visual characteristics of the asset, such as colors, patterns, and other visual characteristics. Different skins can be applied on the same mesh, thereby changing the visual appearance. For example, a building mesh can have different skins which change the appearance of the building when rendered within the virtual environment of the game application, such as different window patterns on the building. In some embodiments, different meshes can be used for the same type of building. For example, a building type may have plurality of defined meshes of different shapes or a range of shapes and sizes that can be used by the building type. The available skin and mesh combinations can be matched to the geographic entities. Each mesh and skin can have defined characteristics that can be matched to the geographic entities. The values for the characteristics can be based on set parameters associated with the asset, manually provided values, automatically generated values based on automated processing of the asset.

In some embodiments, the asset matching system 136 can match the geographic entities to the virtual assets using a machine learning model. The asset matching system 136 can be configured to generate one or more virtual asset matching models. The machine learning algorithms can be configured to adaptively develop and update asset matching models and/or electronic filters based on input data sets along with one or more desired outcome criteria. The asset matching models can be generated using one or more machine learning algorithms based on a defined rule set associated with the algorithms. The inputs for the machine learning algorithms may include aggregated historical data received from the application host systems, operation of the game application, user feedback, the location selection system 132, the asset analysis system 134, asset matching rule sets, and other inputs. The machine learning models for the asset matching system can constantly evolve based on interactions of the users with the virtual environments. For example, the asset matching model can be updated based on user selections and modifications within the application.

Some examples of machine learning algorithms that can be used to generate and update the asset matching models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The asset matching system 136 may determine matching scores for matching the geographic entities and/or topographical elements to virtual assets based at least in part on a defined rule set, asset matching model(s), and/or other matching criteria. The matching of geographic entities to virtual assets can be referred to as local matches. Based at least in part on the scores, the asset matching system 136 can generate a virtual asset match for each of the geographic entities or topographical elements. The asset matching system 136 can generate a virtual environment map of the region. The virtual environment map can define the topography and the location of the each of the matched virtual assets within the region that corresponds to its real world counterpart. In some embodiments, the asset matching system can generate a plurality of virtual maps for a location. The plurality of virtual maps can be provided to the user for selection.

In some embodiments, the asset matching system 136 can generate global match score associated with a user account. The global match score can be based on matching an overall configuration of the virtual assets identified within a virtual map with the virtual assets associated the user account. The global match score can be configured to sacrifice local match quality to improve global match quality. For example, a sub-optimal local asset match may be selected to ensure completeness of map rather than have large missing areas of the virtual map. The asset matching system 136 can be configured to populate the virtual environment map with virtual assets associated with a user account. In instances where a user account may have less than the total number of virtual assets needed to populate the entire virtual environment map, the asset matching system 136 can prioritize the placement of assets within the virtual environment map based on a defined map population rule set. The rule set may be configured to populate the virtual mapping based on various criteria, such as, for example, the populating from the center and expanding outward; prioritizing population of defined points of interest; populating the map to encourage the acquisition of missing virtual assets; or using other map population criteria.

The asset matching system 136 can be configured to identify each of the missing virtual assets required by the user to complete the virtual mapping of the region. Additionally, the asset matching system 136 can generate recommendations for acquisition of missing virtual assets associated with a region. The recommendations can provide the user with in-game actions that are required (such as, missions, quests, and the like), the amount of virtual or real currency required (such as tokens, gold, gems, real world currency, and the like), alternative virtual assets that may already owned by the user, and/or other types of recommendations for completing the virtual mapping.

The asset matching system 136 can be further configured to gather feedback associated with the defined mapping based on changes implemented by users and/or administrators within the game application. The users may modify or change the virtual assets that were matched by the asset matching system 136. For example, the asset matching system 136 may have selected a specific type of store for a geographic asset, and the user may replace the virtual asset with a different type of store, which may be a better match for the real-world store.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Virtual Environment Mapping System Interactions

Figure 2:
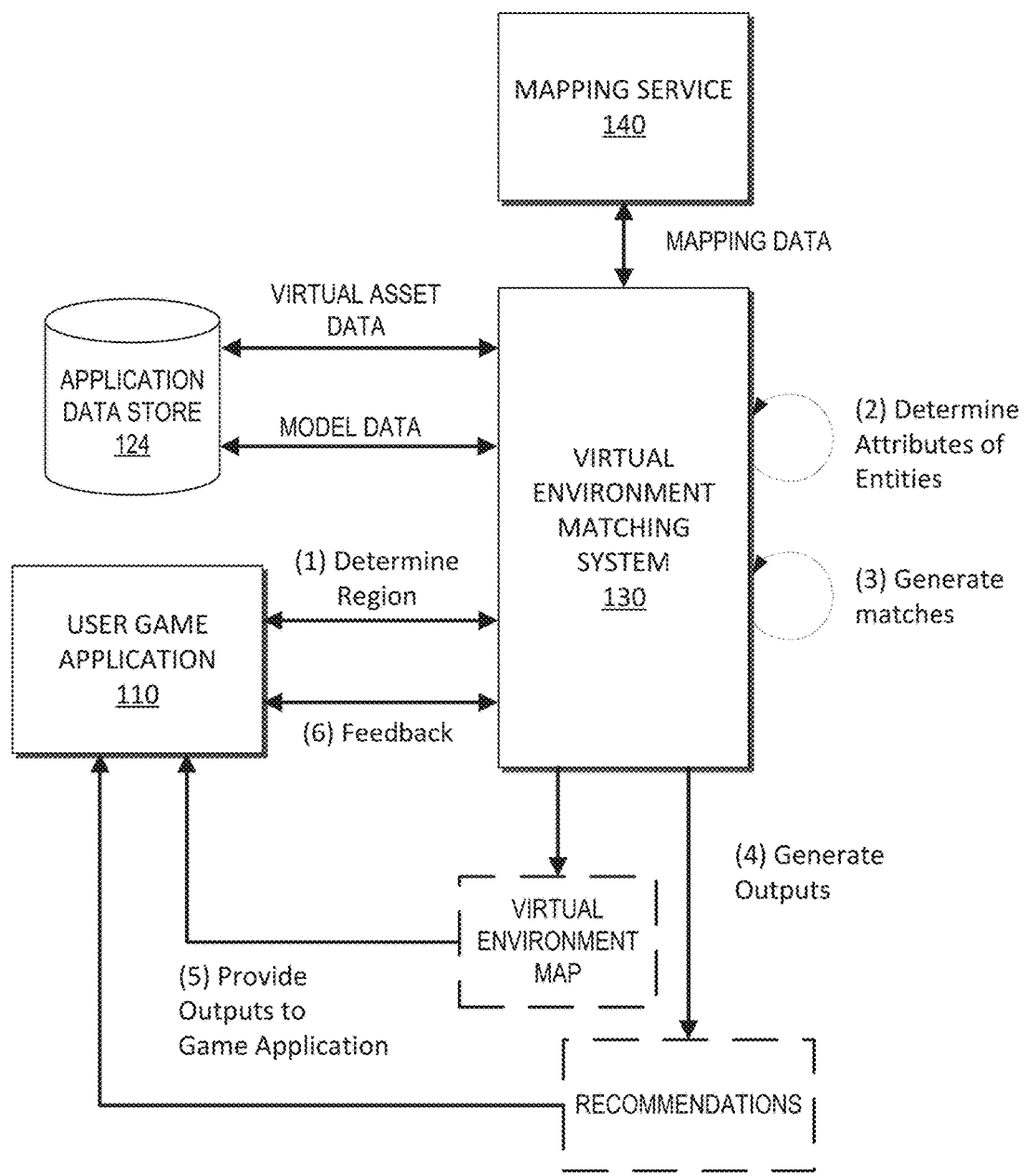
FIG. 2 illustrates an embodiment of a block diagram illustrating embodiments of a virtual environment mapping process.

FIG. 2 illustrates embodiments of interactions between the virtual environment mapping system 130, the mapping service 140, application data store 124, and the user game application 110 when executing a virtual mapping process.

During the virtual mapping process, the virtual environment mapping system 130 can communicate with the application data store 124 to access virtual asset data associated with the game application 110. The virtual asset data can define virtual assets associated with the game application 110. The virtual asset data can identify and define each virtual asset within the game application 110. The data communicated to the virtual environment mapping system 130 by the application data store may be a subset of the virtual asset data associated with the game application. For example, the virtual environment mapping system 130 may query the application data store in order to receive specific types of data associated with the virtual assets.

In some embodiments, the virtual environment mapping system 130 can communicate with the application data store 124 to access model data associated with the game application. The model data can include one or models previously generated and associated with the game application 110 and/or geographic data. The models can be used at various points during the virtual mapping process. In some embodiments, one or models may be used during analysis of the geographic data to identify and determine attributes associated with geographic entities. In some embodiments, one or more models may be used to match the geographic entities with the virtual assets.

During the virtual mapping process, the virtual environment mapping system 130 can communicate with one or more mapping services 140 to access geographic data associated with geographic locations. The mapping services can provide geographical and supplemental data associated with geographic locations.

At (1), the virtual environment mapping system 130 can communicate with the user game application 110 to determine a region. The user computing system can communicate a location identifier from the game application 110 to the virtual environment mapping system 130. The virtual environment mapping system 130 can use the location identifier to determine a geographic region. The location identifier may be a specific address, a zip code, a city, or other location identifier provided by the game application 110. The virtual environment mapping system 130 can use the location identifier to identify a region based at least in part on rules and/or constraints of the game application. In some embodiments, the virtual environment mapping system 130 can be configured to further communicate with the game application to refine the location identifier so that a region appropriate for the game application 110 can be selected.

At (2), the virtual environment mapping system 130 can determine attributes associated with the geographic entities within the identified region. The virtual environment mapping system 130 can analyze mapping data, such as topographical and geographical information received from one or more mapping service 140 to identify entities and determine their associated attributes. The virtual environment mapping system 130 can identify and analyze each of the geographic entities within the region. The virtual environment mapping system 130 can use image recognition analysis, supplemental data analyses, and other types of analyses to determine attributes associated with each of the geographic entities.

At (3), the virtual environment mapping system 130 can match the geographic entities to virtual assets within the game application 110. The asset matching system 136 can generate a match between each of the geographic entities and the virtual assets of the game application using a defined rule set, asset matching model(s), and/or other matching criteria. In some embodiments, the virtual environment mapping system 130 may determine matching scores for matching the geographic entities to virtual assets. Based at least in part on the scores, the asset matching system 136 can generate a virtual asset match for each of the geographic entities or topographical elements.

At (4), after the matching is completed, the virtual environment mapping system 130 can be configured to generate a virtual environment map. The virtual environment map can define the topography of the region. The virtual environment map can be populated with the matched virtual assets that correspond to their real world counterpart.

In some embodiments, the virtual environment mapping system 130 can generate one or more recommendations associated with the virtual environment map. In game applications where virtual assets are associated with a user account, the virtual environment mapping system 130 can be configured to map the virtual assets associated with a user account to the virtual environment map. The virtual environment mapping system 130 can be configured to identify each missing virtual asset required to complete the virtual environment map of the region. Additionally, the asset matching system 136 can generate recommendations to the user for acquisition of missing virtual assets. The recommendations can provide the user with in-game actions that are required (such as, missions, quests, and the like), the amount of virtual or real currency required (such as tokens, gold, gems, and the like), alternative virtual assets already owned by the user, and/or other types of recommendations for completing the virtual environment map. In some embodiments, the asset matching system can reorder the display of assets within the application based on the location selected by the user. The virtual assets needed to complete the map of the selected location can be prioritized above other virtual assets and displayed prior to the other virtual assets in virtual asset acquisition portion of the application.

At (5), the virtual environment mapping system 130 can provide the generated outputs to the user game application 110 for rendering and display within the game application. The output can include the virtual environment map. In some embodiments, the virtual environment mapping system 130 can output any determined recommendations.

At (6), the virtual environment mapping system 130 can receive feedback from the game application 110. The virtual environment mapping system 130 can gather feedback associated with the defined mapping based on changes implemented by users within the game application. Users may modify or change the matches of the virtual assets determined by the virtual environment mapping system 130. For example, a user may select a specific type of store for a real world asset that is different from the virtual asset selected by the virtual environment mapping system 130. The virtual asset selected by the user may be a better match for the real-world entity. The asset matching system 136 can use the feedback information to update and retrain the machine learning model data.

User Interface

FIGS. 3A-3D depict various user interfaces for interfacing with the virtual environment mapping system 130 within a game application 110 on a user computing system 102. Each of the user interfaces shown includes one or more user interface controls that can be selected by a user, for example, using a browser or other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

Figure 3A:
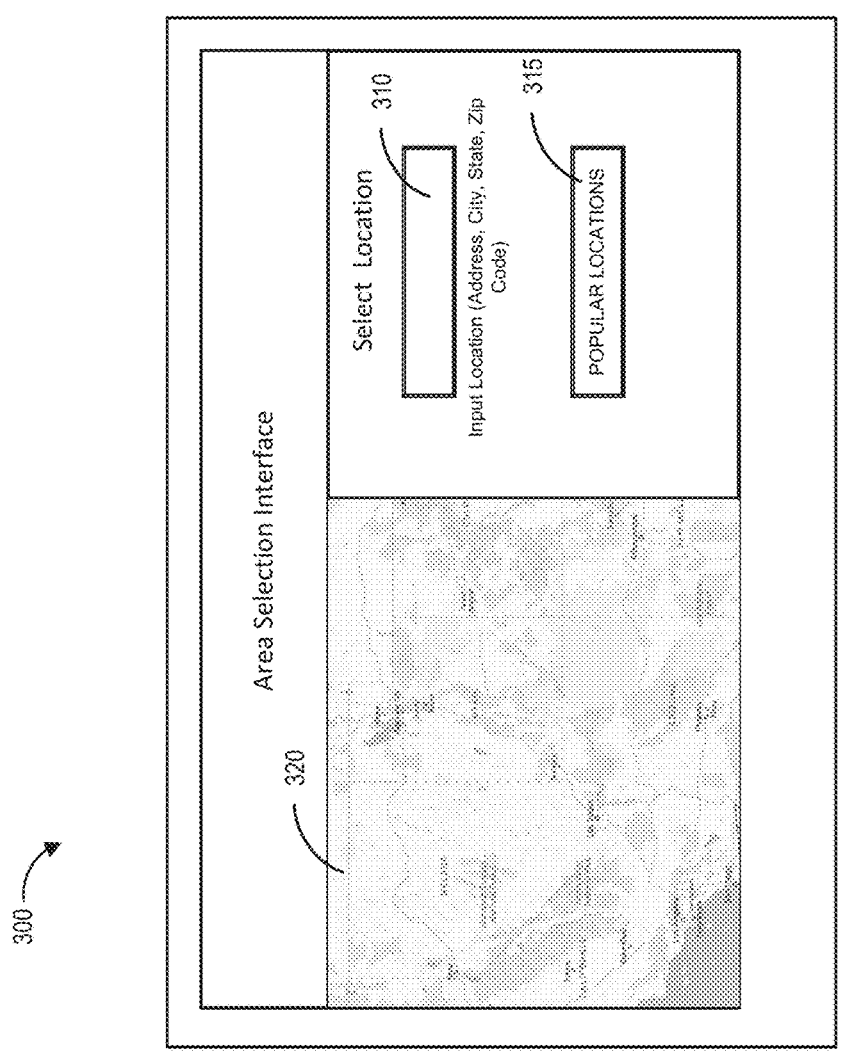
FIGS. 3A, 3B, 3C, and 3D present embodiments of user interfaces illustrating various states of virtual environment mapping process on a user computing system.

FIG. 3A illustrates an example embodiment of an area selection user interface 300 of the game application 110. The area selection user interface 300 includes an input control 310 that can allow the user to input a specific location, such as an address, a zip code, a city, or other type of location. The user interface can include an input control 315 that can identify popular locations that are automatically generated and provided to the user. The user interface can include a map 320, which can provide a real world view of the selected location (such as, a map view or satellite view). In some embodiments, the user can select a location using the map 320 by providing input on the map, such as circling or providing other input that allows for the virtual environment mapping system 130 to determine a desired location. In some embodiments the interface may include an input control that is configured so that the user can input a time frame for the map data, which can provide the user with access to historical map data. In some embodiments, the user may be able to browse previously generated maps from other users.

Figure 3B:
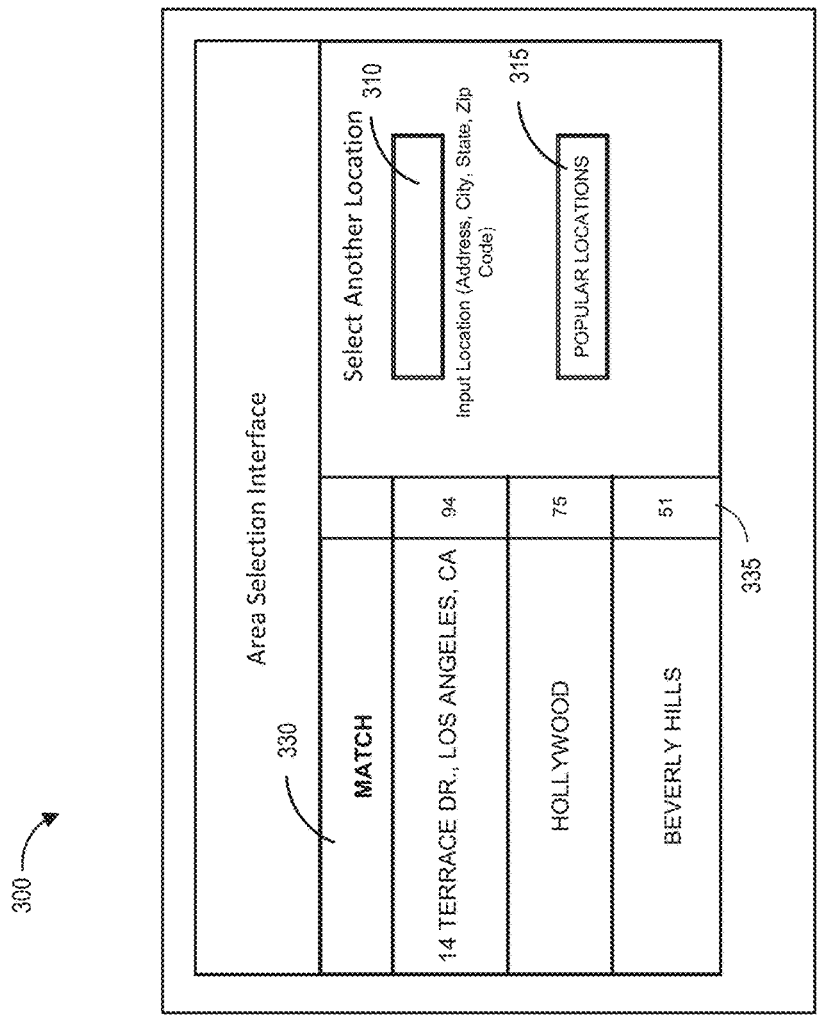

FIG. 3B illustrates another user interface 300 after the user submits the location information. The user interface 300 can provide a list 330 of one or more locations based on the input provided by the user. In the illustrated embodiment, the user provided the location "14 Terrace Drive, LA". The list can include a score 340 associated with each location. The score can be based on a matching score, a popularity score, or other ranking associated with the list. In some embodiments, the matching score can be based on how well the user's virtual assets match to the geographic entities of the selected location. A popularity score may be based on how many users select the indicated location. In some embodiments, the matching interface can provide controls that allow the user to filter the matching results based on different prioritization criteria. The user can select one of the displayed locations or provide additional input to select another location. After selection of the location, the virtual environment mapping system 130 can determine the region for the identified location and generate a virtual environment map.

Figure 3C:
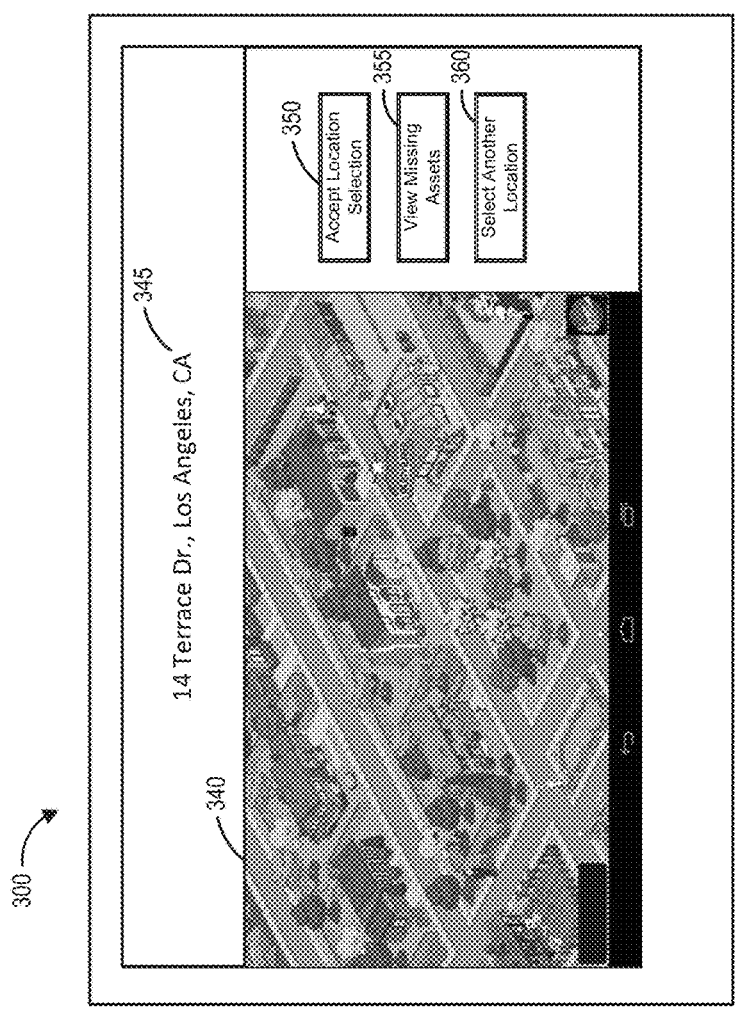

FIG. 3C illustrates the user interface 300 after receiving a selection of a specific location 345. In the illustrated embodiment, the virtual environment mapping system 130 has generated the virtual environment map 340 associated with the determined region. The virtual environment map 340 can be generated based on a matching of the geographic entities and the virtual assets, as described in further detail herein. The user interface may include a user controls 350 that allows the user to accept the selected location, another user control 355 that allows the user to see generated map with only the virtual assets associated with the user's account (illustrated in FIG. 3D), and a user control 360 that allows a user to select a different location. The illustrated embodiment displays only a portion of the determined virtual environment map, but the user can be provided with the functionality to view the entire region, such as user controls for navigating the generated virtual environment map 340.

Figure 3D:
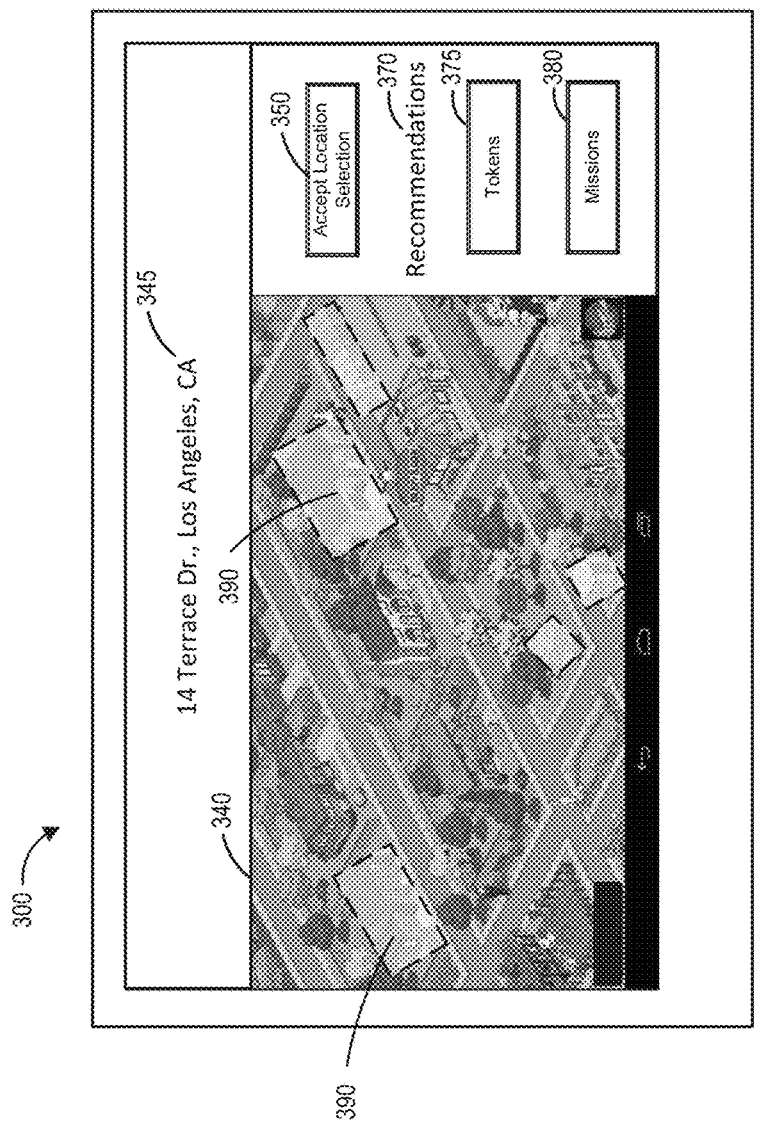

FIG. 3D illustrates the user interface 300 with an identification of virtual assets that are missing from the user's account in order to complete the virtual environment map. In the illustrated embodiment, the missing virtual assets 390 are identified by dashed boxes. The user interface can provide one or more recommendations 370 associated with the virtual assets. The recommendations 370 may include virtual currency based recommendations 375, which can provide the user with the amount of virtual currency needed to acquire the remaining virtual assets. The recommendations may include objective based recommendations 380, which can provide the user with specific in-game missions or quests that can be completed in order to acquire one or more of the missing virtual assets. After the user accepts the location, the game application can generate the location using the virtual environment map and positioning the user's virtual assets in the determined locations.

Process for Virtual Mapping of a Real World Location within a Game Application

Figure 4:
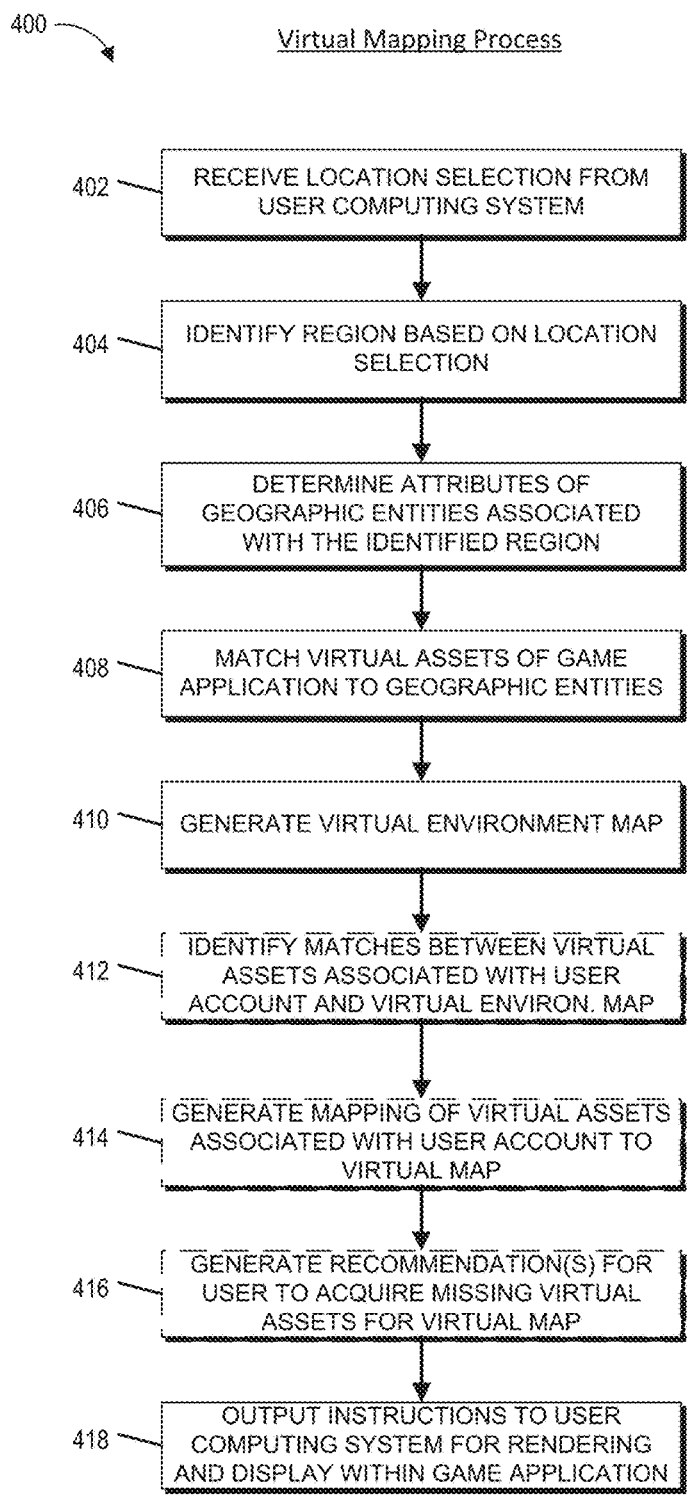
FIG. 4 illustrates a flowchart of an embodiment of a virtual mapping process.

FIG. 4 illustrates an embodiment of a flowchart for a process for virtual mapping of a real world location within a game application. The process 400 can be implemented by any system that can generate a virtual environment map of a real world location within a virtual environment of a digital application. For example, the process 400, in whole or in part, can be implemented by a virtual environment mapping system 130, a virtual mapping module 118, a game application 110, a location selection system 132, an asset analysis system 134, asset matching system 136, or other computing system. Although any number of systems, in whole or in part, can implement the process 400, to simplify discussion, the process 400 will be described with respect to particular systems.

At block 402, the virtual environment mapping system 130 can receive a location selection from a user computing system. The location selection can be a location identifier, such as, for example a specific address, a zip code, a city, or other type of location identifier.

At block 404, the virtual environment mapping system 130 can identify a region based at least in part on the location selection. In some embodiments, the virtual environment mapping system 130 can interact with the user to refine the selection of the region. The virtual environment mapping system 130 can define a region based at least in part on the selected location, one or more rule sets, and/or constraints of the game application. For example, the virtual environment mapping system 130 may select a region that has a radius of 0.5 miles radiating out from an address associated with the location identifier. In some embodiments, the game application 110 may provide the user with additional control over various parameters associated with the defining and selecting a size and shape of the region associated with the selected location.

At block 406, the virtual environment mapping system 130 can determine attributes associated with geographic entities within the identified region. The virtual environment mapping system 130 can access geographic information associated with the region. The geographic information can be provided by one or more mapping service 140, and/or other data services or repositories. The virtual environment mapping system 130 can identify and analyze each of the geographic entities within the region. The virtual environment mapping system 130 can analyze the geographic data to determine attributes associated with the entities, such as visual or functional attributes associated with the geographic entities.

At block 408, the virtual environment mapping system 130 can match virtual assets of the game application to the geographic entities. The virtual environment mapping system 130 can use the determined attributes for the geographic entities and the predefined attributes of the virtual assets to determine matches between the virtual assets and the geographic entities. The virtual environment mapping system 130 may determine matching scores for matching the geographic entities and/or topographical elements to virtual assets based at least in part on a defined rule set, asset matching model(s), and/or other matching criteria. Based at least in part on the scores, the virtual environment mapping system 130 can generate a virtual asset match for each of the geographic entities or topographical elements.

At block 410, the virtual environment mapping system 130 can generate a virtual environment map. The virtual environment map can define the topography of the virtual region and the location of the each of the matched virtual assets within the region that corresponds to its real world counterpart. Each geographic entity identified within the region can be matched to a virtual asset.

At block 412, optionally, the virtual environment mapping system 130 can identify matches between virtual assets associated with a user account and the virtual environment map. The virtual environment mapping system 130 can further identify virtual assets associated with the virtual environment map missing that are not associated with the user account.

At block 414, optionally, the virtual environment mapping system 130 can generate a mapping of virtual assets associated with the user account to the virtual environment map. The virtual environment mapping system 130 can populate the virtual environment map based on a population algorithm. The virtual environment mapping system 130 can prioritize the placement of assets within the virtual environment map based on a defined map population rule set. The rule set may be configured to populate the virtual mapping based on various criteria, such as, for example, the populating from the center and expanding outward; prioritizing population of defined points of interest; populating the map to encourage the acquisition of missing virtual assets; or using other map population criteria.

At block 416, optionally, the virtual environment mapping system 130 can generate one or more recommendations for acquisition of missing virtual assets associated with the virtual environment map. The recommendations can provide the user with in-game actions that are required (such as, missions, quests, and the like), the amount of virtual or real currency required (such as tokens, gold, gems, real world currency, and the like), alternative virtual assets that may already owned by the user, and/or other types of recommendations for completing the virtual environment map.

At block 418, the virtual environment mapping system 130 can output instructions to the user computing system for rendering and display of the virtual environment map and/or the recommendations within the game application.

Overview of Computing Device

Figure 5:
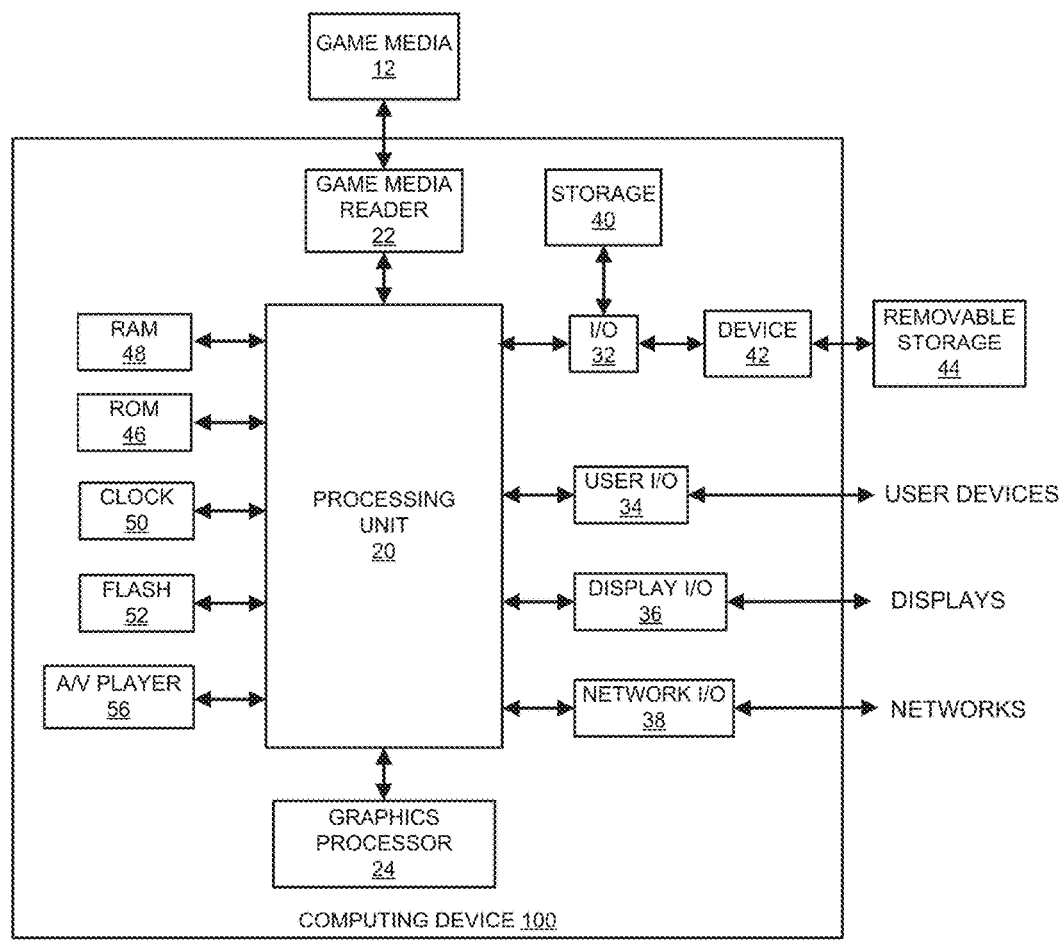
FIG. 5 illustrates an embodiment of a computing device.

FIG. 5 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online and/or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
  under control of one or more hardware computing devices configured with specific computer-executable instructions, the specific computer-executable instructions stored in an electronic hardware memory,
    receiving, over a network from a user computing system executing a game application, a location identifier data packet comprising an indication of a geographic location;
    receiving, over the network, geographic information data packets from at least one mapping service, the geographic information data packets comprising geographic data associated with the geographic location;
    determining a geographic region based at least in part on the location identifier data packet and the geographic information data packets;
    identifying a plurality of geographic entities within the geographic region based at least in part on an analysis of at least a portion of the geographic information data packets;
    for at least a subset of the plurality of geographic entities within the geographic region, determining attributes defining the geographic entity, resulting in a plurality of defined geographic entities;
    accessing virtual asset data in a physical data store, wherein the physical data store is configured to store virtual asset data structures storing virtual asset data defining a plurality of virtual assets used within the game application;

for each defined geographic entity of the plurality of defined geographic entities, matching, using a machine learning based model, the defined geographic entity to a virtual asset based at least in part on the determined attributes of the defined geographic entity, resulting in a plurality of matched virtual assets;

generating a virtual environment map comprising matched virtual assets of the plurality of matched virtual assets positioned at defined locations within the virtual environment map, wherein the defined locations of the matched virtual assets within the virtual environment map correspond to locations of the geographic entities within the geographic region;

transmitting a map output data packet to the user computing system, the map output data packet comprising instructions for display of the virtual environment map within the game application;

receiving a feedback data packet from the game application associated with the matching of the defined geographic entity to the virtual asset, wherein the feedback data packet identifies a change of the matched virtual asset to a different virtual asset within the virtual environment map; and updating the machine learning based model based, at least in part, on the feedback data packet.

2. The method of claim 1, wherein the attributes of the geographic entity define visual characteristics of the geographic entity.

3. The method of claim 1, wherein each geographic entity of the plurality of geographic entities is at least one of vegetation, a structure, infrastructure, or terrain.

4. The method of claim 1 further comprising:
identifying a user account associated with the game application;
identifying virtual assets associated with the user account;
identifying matched virtual assets in the virtual environment map that are not associated with the user account; and
determining a recommendation associated with the matched virtual assets that are not associated with the user account.

5. The method of claim 4, wherein the recommendation comprises an identification of one or more actions required within the game application to acquire the one or more of the matched virtual assets that are not associated with the user account.

6. A system comprising:
an electronic data store configured to store virtual asset data storing virtual asset data defining a plurality of virtual assets used within a game application;
a hardware processor in communication with the electronic data store, the hardware processor configured to execute specific computer-executable instructions to at least:
receive, over a network from a user computing system executing the game application, a location identifier data packet comprising an indication of a geographic location;
determine a geographic region based at least in part on the location identifier data packet and geographic information associated with the geographic location, wherein the geographic region comprises a plurality of geographic entities;

for at least a subset of the plurality of geographic entities within the geographic region, determine attributes defining the geographic entity, resulting in a plurality of defined geographic entities;
access virtual asset data in the electronic data store;
for each defined geographic entity of the plurality of defined geographic entities, match, using a machine learning based model, the defined geographic entity to a virtual asset based at least in part on the determined attributes of the defined geographic entity, resulting in a plurality of matched virtual assets;
generate a virtual environment map comprising matched virtual assets of the plurality of matched virtual assets positioned at defined locations within the virtual environment map, wherein the defined locations of the matched virtual assets within the virtual environment map correspond to locations of the geographic entities within the geographic region;
transmit a map output data packet to the user computing system, the map output data packet comprising instructions for display of the virtual environment map within the game application;
receive a feedback data packet from the game application associated with the matching of the defined geographic entity to the virtual asset, wherein the feedback data packet identifies a change of a matched virtual asset to a different virtual asset within the virtual environment map; and
update the machine learning based model based, at least in part, on the feedback data packet.

7. The system of claim 6, wherein the geographic information comprises at least one of visual data, supplemental data, or categorical data.

8. The system of claim 6, wherein the geographic information comprises topographical information of the geographic region.

9. The system of claim 6, wherein the hardware processor is further configured to execute instructions to:
identify a user account associated with the game application;
identify virtual assets associated with the user account;
identify matched virtual assets in the virtual environment map that are not associated with the user account; and
determine a recommendation associated with the matched virtual assets that are not associated with the user account.

10. The system of claim 9, wherein the recommendation comprises an identification of one or more actions required within the game application to acquire one or more of the matched virtual assets that are not associated with the user account.

11. A non-transitory computer-readable storage medium storing computer executable instructions that, when executed by one or more computing devices, configure the one or more computing devices to perform operations comprising:
under control of one or more hardware computing devices configured with specific computer-executable instructions, the specific computer-executable instructions stored in an electronic hardware memory,
receiving, over a network from a user computing system executing a game application, a location identifier data packet comprising an indication of a geographic location;
determining a geographic region based at least in part on the location identifier data packet and geographic information associated with the geographic location, wherein the geographic region comprises a plurality of geographic entities;

for at least a subset of the plurality of geographic entities within the geographic region, determining attributes defining the geographic entity, resulting in a plurality of defined geographic entities;

accessing virtual asset data in a physical data store, wherein the physical data store is configured to store virtual asset data structures storing virtual asset data defining a plurality of virtual assets used within the game application;

for each defined geographic entity of the plurality of defined geographic entities, matching, using a machine learning based model, the defined geographic entity to a virtual asset based at least in part on the determined attributes of the defined geographic entity, resulting in a plurality of matched virtual assets;

generating a virtual environment map comprising matched virtual assets of the plurality of matched virtual assets positioned at defined locations within the virtual environment map, wherein the defined locations of the matched virtual assets within the virtual environment map correspond to locations of the geographic entities within the geographic region;

transmitting a map output data packet to the user computing system, the map output data packet comprising instructions for display of the virtual environment map within the game application;

receiving a feedback data packet from the game application associated with the matching of the defined geographic entity to the virtual asset, wherein the feedback data packet identifies a change of a matched virtual asset to a different virtual asset within the virtual environment map; and updating the machine learning based model based, at least in part, on the feedback data packet.

12. The non-transitory computer-readable storage medium of claim 11, wherein the attributes of the geographic entity define visual characteristics of the geographic entity.

13. The non-transitory computer-readable storage medium of claim 11, wherein the one or more hardware computing devices are further configured to execute instructions to perform operations comprising:

identifying a user account associated with the game application;

identifying virtual assets associated with the user account;

identifying matched virtual assets in the virtual environment map that are not associated with the user account; and determining a recommendation associated with the matched virtual assets that are not associated with the user account.

14. The non-transitory computer-readable storage medium of claim 13, wherein the recommendation comprises an identification of one or more actions required within the game application to acquire the one or more of the matched virtual assets that are not associated with the user account.

* * * * *